(12) United States Patent
Yamazaki et al.

(10) Patent No.: US 8,243,232 B2
(45) Date of Patent: Aug. 14, 2012

(54) BACKLIGHT FOR LIQUID CRYSTAL DISPLAY DEVICE AND LIQUID CRYSTAL DISPLAY DEVICE USING THE SAME

(75) Inventors: Sachiko Yamazaki, Mobara (JP); Ryutaro Oke, Chiba (JP); Ikuko Imajo, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 268 days.

(21) Appl. No.: 12/547,686

(22) Filed: Aug. 26, 2009

(65) Prior Publication Data

US 2010/0053505 A1 Mar. 4, 2010

(30) Foreign Application Priority Data

Aug. 28, 2008 (JP) ................................. 2008-220135

(51) Int. Cl.
G02F 1/1335 (2006.01)
F21V 7/04 (2006.01)
(52) U.S. Cl. .............................. 349/67; 349/61; 362/609
(58) Field of Classification Search .................... 349/67, 349/61; 362/609
See application file for complete search history.

(56) References Cited

U.S. PATENT DOCUMENTS 7,275,852 B2 * 10/2007 Kim et al. .................... 362/612
7,324,174 B2    1/2008 Hafuka et al.
2007/0002590 A1 *  1/2007 Jang et al. ..................... 362/633
2008/0036940 A1 *  2/2008 Song et al. ....................... 349/61
2008/0123022 A1 *  5/2008 Aoki et al. ....................... 349/68

FOREIGN PATENT DOCUMENTS

| CN | 1842737 | 10/2006 |
|---|---|---|
| CN | 1920641 | 2/2007 |
| JP | 2007-073295 | 3/2007 |

* cited by examiner

Primary Examiner — Mark Robinson
Assistant Examiner — Charles Chang
(74) Attorney, Agent, or Firm — Antonelli, Terry, Stout & Kraus, LLP.

(57) ABSTRACT

An object of the present invention is to provide a backlight for a liquid crystal display device which is easy to repair and prevents the brightness from lowering on the screen, and thus can provide high-quality images, where the region where point light source elements are aligned is divided into a number of smaller regions, and backlight units are provided so as to correspond to the respective smaller regions, as well as a liquid crystal display device using the same. The present invention provides a backlight for a liquid crystal display device where a number of point light source elements 2 are aligned in a plane, having: a number of backlight units, each of which is formed of a support substrate 31, 32 for supporting point light source elements 2 and point light source elements 2 arranged on the support substrate, the region in which the point light source elements are aligned being divided into a number of smaller regions, each of which having a backlight unit; and a reflective sheet provided on the support substrates of the backlight units, having openings created at points where the point light source elements are located, characterized in that the reflective sheet is formed of a number of sheets 41, 42 and covers the entire region.

7 Claims, 7 Drawing Sheets

BACKLIGHT FOR LIQUID CRYSTAL DISPLAY DEVICE AND LIQUID CRYSTAL DISPLAY DEVICE USING THE SAME

The present application claims priority over Japanese Application JP 2008-220135, filed on Aug. 28, 2008, the contents of which are hereby incorporated into this application by reference.

BACKGROUND OF THE INVENTION (1) Field of the Invention

The present invention relates to a backlight for a liquid crystal display device and a liquid crystal display device using the same, and in particular, to a backlight for a liquid crystal display device where a number of point light source elements are regularly aligned in a plane and a liquid crystal display device using the same.

(2) Related Art Statement

Conventional liquid crystal display devices use a backlight for illuminating the liquid crystal panel from the rear. Various types of light sources can be used as the backlight, and fluorescent lamps, such as cold cathode tubes and external electrode fluorescent lamps, surface light sources, such as electroluminescence, and point light sources, such as light emitting diodes, are mainly used.

In recent years, demands in an increase in the size of the screen of liquid crystal display devices, a reduction in the power consumption and control of the turning on and off of the backlight in accordance with the displayed image have specifically made the need for a backlight where light emitting diodes are arranged in a plane.

As shown in FIGS. 1A and 1B, light emitting diodes (LED's) 2, which are point light source elements, are regularly aligned in a plane on a support substrate 3, and thus, form a backlight 1 for a liquid crystal display device. FIG. 1A is a plan diagram showing the backlight, and FIG. 1B is a cross sectional diagram along arrows X-X' in FIG. 1A.

In addition, a reflective sheet 4 where openings 40 are created in positions where LED's are provided is placed on the support substrate 3. This works to direct light emitted from the LED's in the direction towards the liquid crystal panel provided in front of the backlight.

Such a backlight is disclosed in JP2007-73295A, and the structure where a backlight is formed of a single support substrate causes the cost for manufacture to increase as the size of the screen of liquid crystal display devices increases. That is to say, a single support substrate corresponding to a large screen has a high cost and is difficult to handle, and it is necessary to replace the entirety of the substrate even in the case where there is a defect in a portion of a region of the support substrate, which ends up being an extremely high cost.

In order to solve these problems, as shown in FIG. 2, the entire region A where point light source elements 2 are aligned is divided into a number of smaller regions a1 to a8 so that support substrates 31 to 38 are provided for respective smaller regions, and LED's 2, which are point light source elements, are arranged on the respective support substrates. The symbols 51 to 58 are connectors for supplying power in order to drive the LED's 2 arranged on the respective support substrates. Here, dotted lines in FIG. 2 simply indicate that the LED's 2 are aligned side-by-side.

Support substrates having a relatively small size can be used as these divided support substrates, and when there is a defect in a portion of the region of the backlight, only the corresponding support substrate is replaced so that the backlight can be easily repaired. In addition, as shown in FIG. 2, the same backlight units having the same number and the same arrangement of LED's can be used for the respective smaller regions $a_1$ to $a_8$ in the case where the entire region A is divided equally into support substrates having the same size, and thus, it is possible to greatly reduce the cost for manufacture.

In addition, the reflective sheet 4 shown in FIGS. 1A and 1B can be used in the same manner for the divided support substrates.

SUMMARY OF THE INVENTION

Problem to Be Solved by the Invention

A reflective sheet and a support substrate are usually pasted together using two-sided tape or an adhesive, and therefore, as the size of liquid crystal display devices increases, it becomes difficult to match the openings 40 for LED's created in the reflective sheet 4 with the LED's 2 arranged on the support substrate with high precision.

Furthermore, combined support substrates are covered with one large reflective sheet, and therefore, it is necessary to peel off the entire reflective sheet, even in the case where only one support substrate is to be replaced, and thus, the advantage of using combined support substrates is lost.

An object of the present invention is to solve the above described problem, and to provide a backlight for a liquid crystal display device, as well as a liquid crystal display device using the same which is easy to repair, and where uniformity of brightness can be achieved, even in the case where the region on which point light source elements are aligned is divided into a number of smaller regions, and corresponding backlight units are provided for each smaller region.

Means for Solving Problem

In order to solve the above described problem, the present invention is characterized as follows.

(1) A backlight for a liquid crystal display device, where a number of point light source elements are aligned in a plane, having:

a number of backlight units, each of which is formed of a support substrate for supporting point light source elements and point light source elements arranged on the support substrate, the region in which the point light source elements are aligned being divided into a number of smaller regions, each of which having a backlight unit; and a reflective sheet provided on the support substrates of the backlight units, having openings created at points where the point light source elements are located, characterized in that the reflective sheet is formed of a number of sheets and covers the entire region.

(2) The backlight for a liquid crystal display device according to (1), characterized in that the center-to-center distance between point light source elements located at the edge of adjacent sheets is shorter than the center-to-center distance between point light source elements located on the same sheet.

(3) The backlight for a liquid crystal display device according to (1), characterized in that each sheet that forms the reflective sheet includes at least one smaller region, and the minimum unit for the area is one smaller region.

(4) The backlight for a liquid crystal display device according to (3), characterized in that each sheet that forms the reflective sheet has approximately the same area as the backlight units.

(5) The backlight for a liquid crystal display device according to (1), characterized in that the sheets that form the reflective sheet are arranged so as to overlap with each other.

(6) The backlight for a liquid crystal display device according to (1), characterized in that the point light source elements are light emitting diodes.

(7) A liquid crystal display device having a liquid crystal display panel and a direct backlight for illuminating the liquid crystal display panel, characterized in that the backlight for a liquid crystal display device according to any of (1) to (6) is used as the backlight.

Effects of the Invention

According to the present invention, the reflective sheet for covering the entire region where point light source elements are aligned is divided into a number of smaller regions, and backlight units corresponding to the respective smaller regions are used, and thus, assembly is easier, and units are easy to replace. Furthermore, it becomes possible to prevent the brightness from lowering along the border between sheets by adjusting the center-to-center distance between the point light source elements. Therefore, the brightness can be prevented from dropping in the longitudinal direction and lateral direction on the screen, so that high quality images can be provided.

In addition, the respective sheets that form the reflective sheet include at least one smaller region, and the minimum unit for the area is one smaller region, or approximately the same area as the backlight units, and thus, the center-to-center distance between point light source elements located at the edge of adjacent backlight units can be adjusted, and thus, the brightness is easy to adjust, and it can be prevented from lowering. In addition, the brightness lowers only along the border between backlight units, and therefore, it becomes possible to prevent the brightness from dropping, using backlight units of the same standard (the size of the support substrates and the number and arrangement of the point light source elements are the same).

DETAILED DESCRIPTION OF THE INVENTION

In the following, the configuration of the present invention is described in detail using preferred embodiments.

Figure 7:
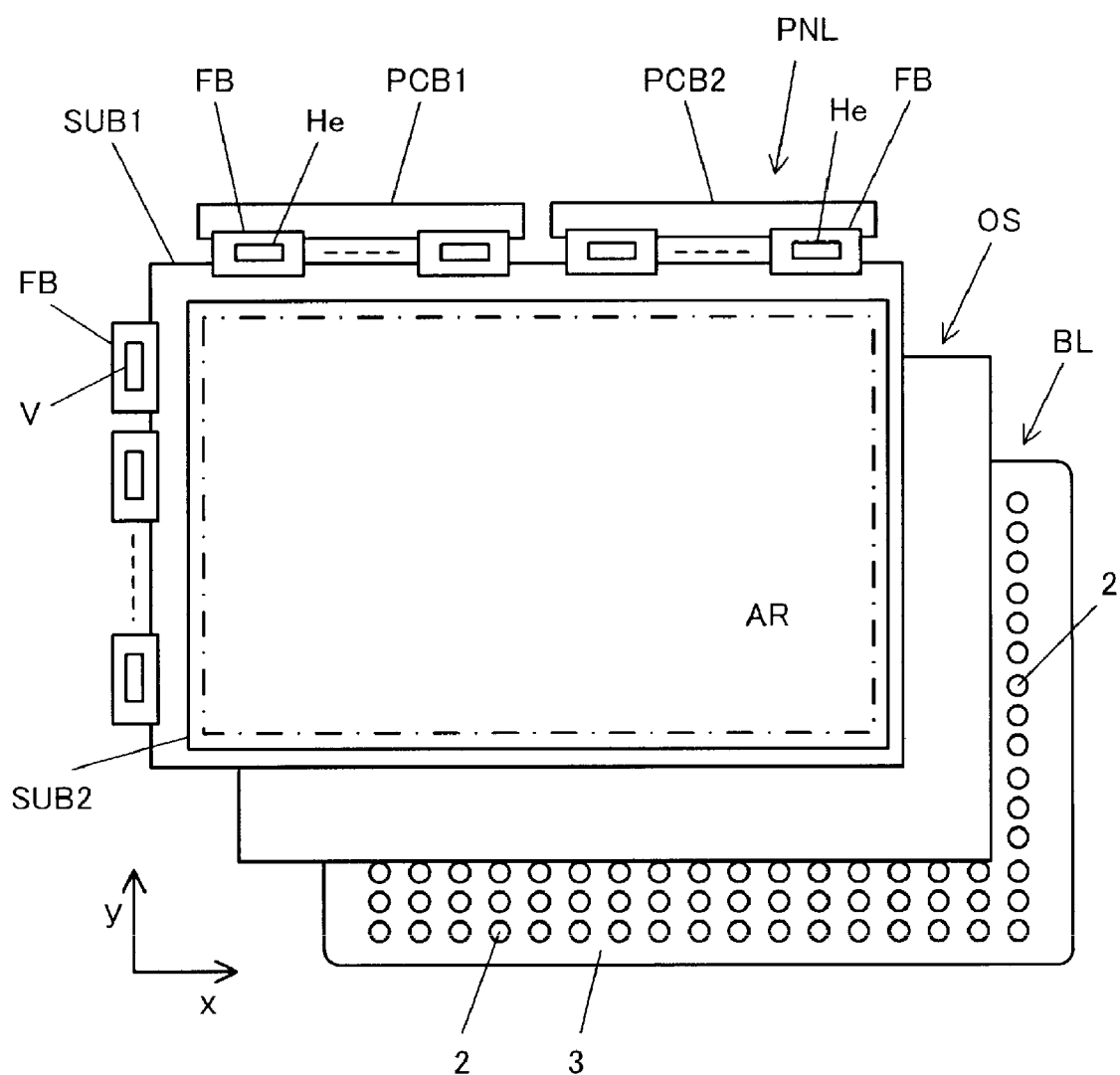
FIG. 7 is a schematic diagram showing the structure of the liquid crystal display device according to the present invention.

FIG. 7 is a schematic diagram showing the configuration of the liquid crystal display device according to the present invention. The liquid crystal display panel PNL is placed on the viewer side, and a sheet OS and a backlight BL are placed to the rear of the liquid crystal display panel PNL in this order.

The liquid crystal display panel PNL has a pair of parallel substrates SUB1 and SUB2 made of glass, for example, and liquid crystal is sandwiched between these substrates SUB1 and SUB2. Pixels (not shown) arranged in a matrix are formed on the liquid crystal side of the substrates SUB1 and SUB2, and have the liquid crystal as one component, so that the light transmittance can be controlled for each pixel. The region where the pixels are formed is used as a display region AR (region surrounded by dotted box), and when light from the backlight BL passes through this display region AR, the viewer can see an image.

Part of the substrate SUB1 is exposed from the substrate SUB2 on the left side and the upper side in the figure, and one side of a number of flexible substrates FB is connected in these portions, for example. Video signal drive circuits He and scan signal drive circuits V for independently driving the above described pixels are formed on these flexible substrates FB.

Video signal drive circuits He are formed on the flexible substrates FB aligned in the direction x in the figure. Printed circuit boards PCB1 and PCB2 are connected on the second side of the flexible substrates FB, where the video signal drive circuits are formed and which faces the first side, on which the substrate SUB1 is connected, so that a video signal can be inputted from a control circuit, not shown, via the printed circuit boards PCB1 and PCB2. In addition, scan signal drive circuits V are formed in the flexible substrates FB which are aligned in the direction y in the figure. Input signals from a display control circuit (not shown) are inputted into the flexible substrates FB on which the scan signal drive circuits V are formed, via wires (not shown) formed on the surface of the printed circuit board PCB1 and the substrate SUB1, and unlike with the flexible substrates FB on which the above described video signal drive circuits He are mounted, no other substrates—not the printed circuit board PCB1 nor PCB2—are connected to the flexible substrates FB on which the scan signal drive circuits V are formed.

A backlight BL is provided on the rear of the liquid crystal display panel PNL with a diffusion sheet, a prism sheet or an optical sheet OS made of a multilayer body of these, in between, for example. The optical sheet OS diffuses or condenses light from the backlight BL so that it is guided to the liquid crystal panel PNL.

The backlight BL is formed so that a number of LED's 2 are arranged in a matrix on the surface of the support substrate 3 which faces at least the display region AR of the liquid crystal display panel PNL.

Figure 1A:
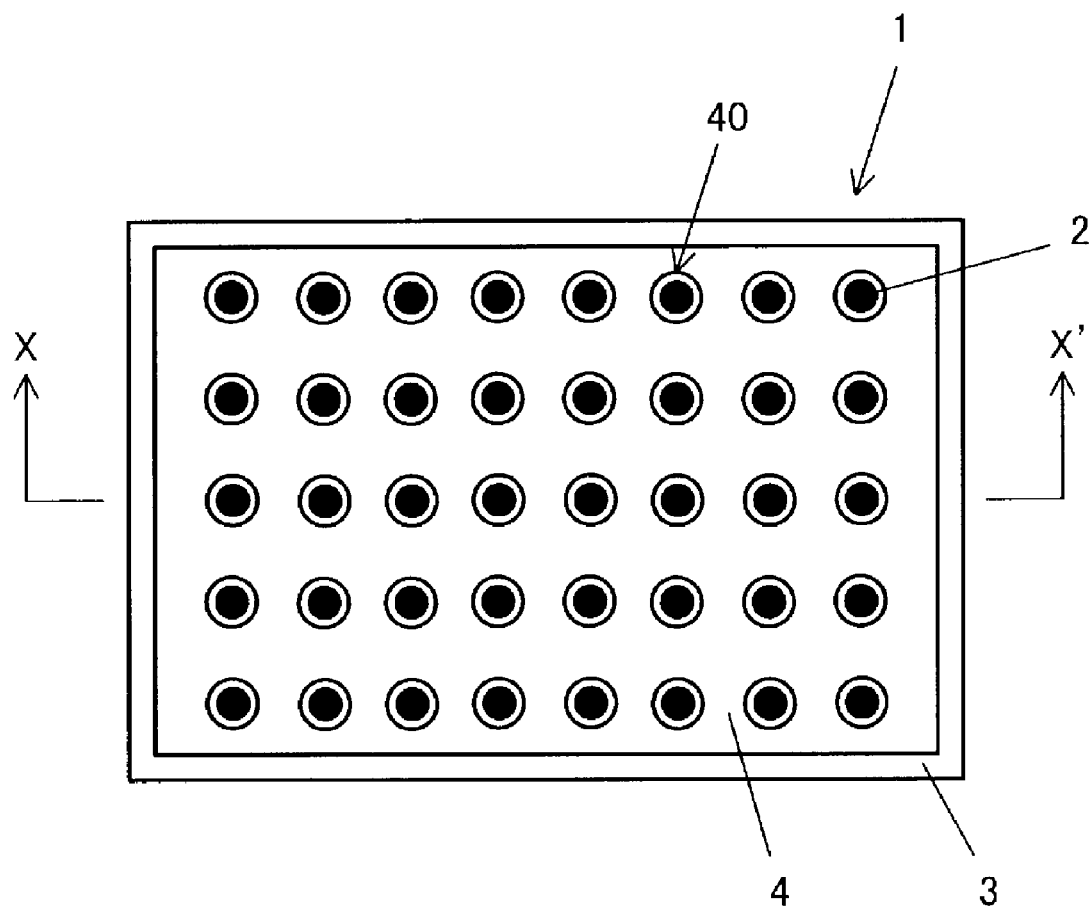
FIGS. 1A and 1B are diagrams showing a backlight using point light source elements.
Figure 1B:
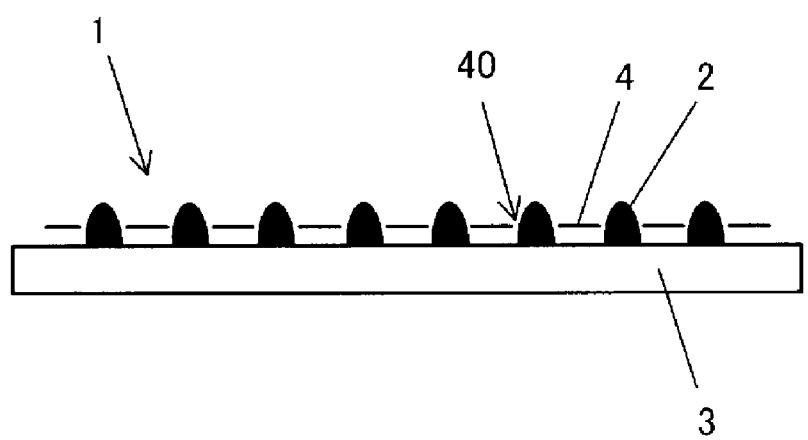
Figure 2:
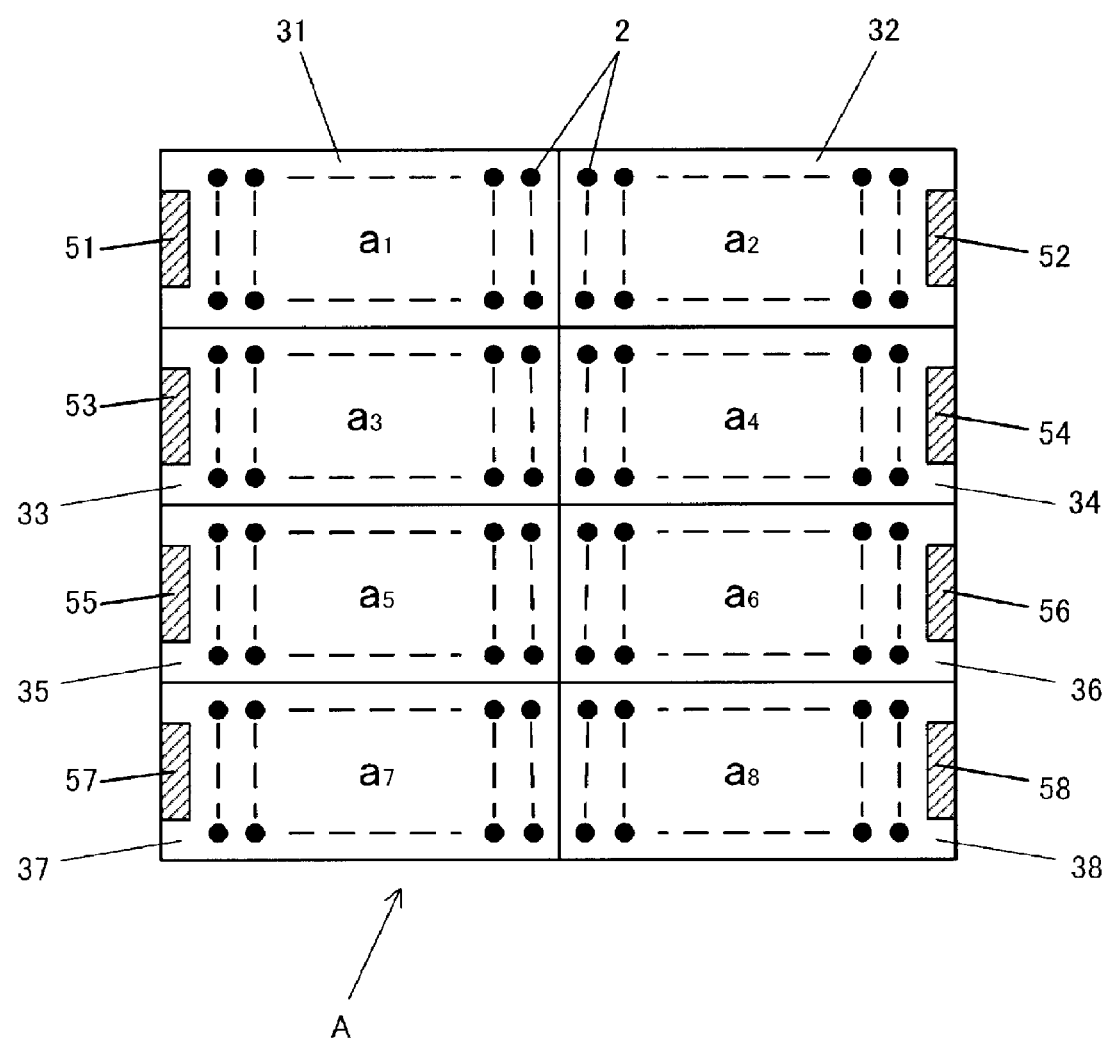
FIG. 2 is a diagram showing a backlight in the case where the region where point light source elements are aligned is divided into a number of smaller regions.

As shown in FIG. 2, the support substrate in the backlight BL according to the present invention is divided into a number of smaller regions $a_1$ to $a_8$. In addition, in the present invention, the reflective sheet is also divided into a number of smaller regions (see FIG. 5).

The reflective sheet which is divided into a number of pieces makes it easy to remove the support substrate and makes repair easy.

Figure 3:
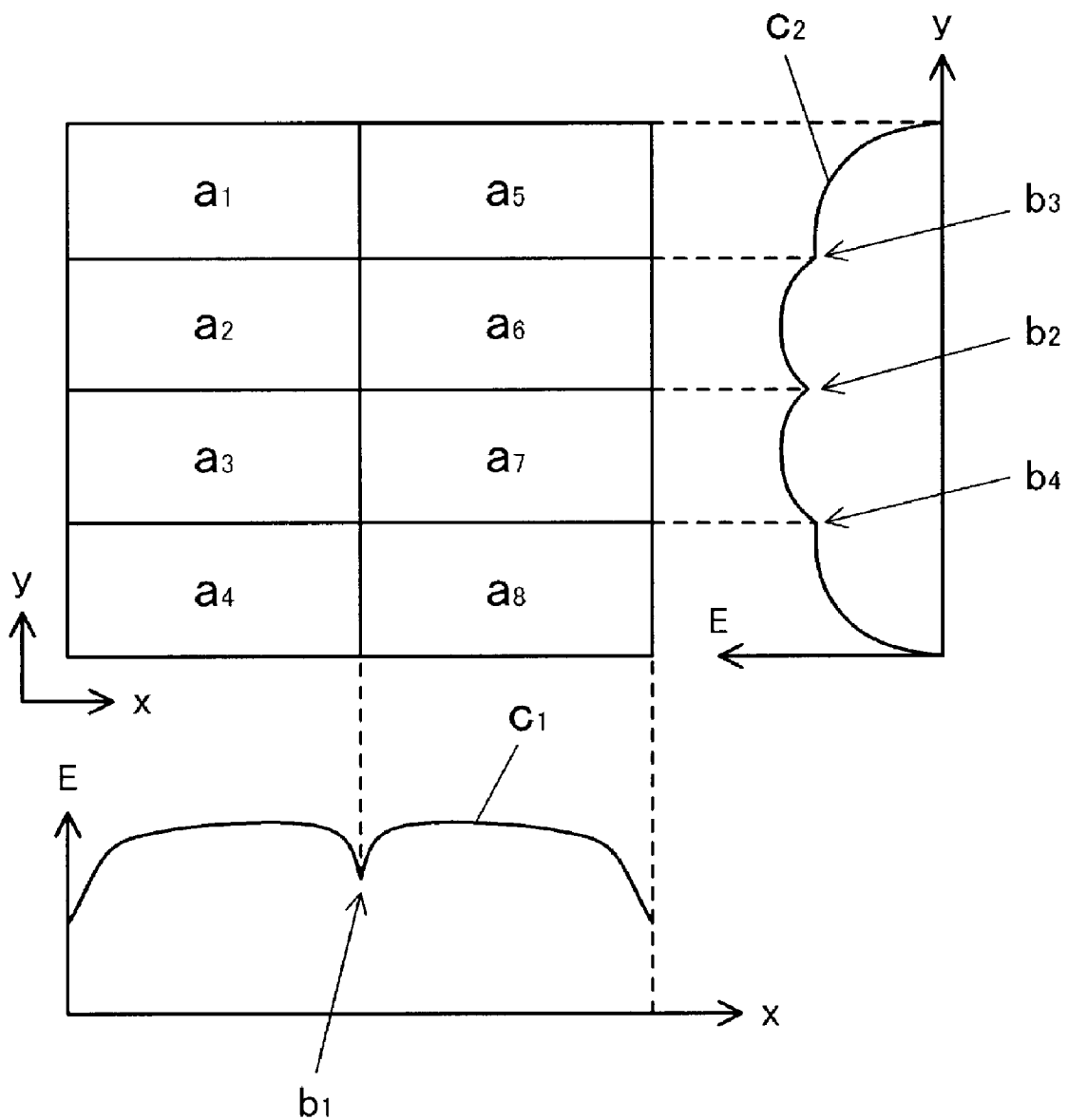
FIG. 3 is a diagram showing the distribution of the brightness in the backlight in FIG. 2.

As shown in FIG. 3, however, the distribution of the brightness of the backlight formed of point light source elements may be inconsistent when the reflective sheet is divided into smaller regions.

The regions $a_1$ to $a_8$ in FIG. 3 correspond to the smaller regions $a_1$ to $a_8$ in FIG. 2, and reflective sheets having approximately the same size as the smaller regions of the support substrate are provided on top of each piece of support substrate.

The present inventors provided 64 LED's in each small region in the structure in FIG. 3, so that the LED's were aligned with equal intervals of approximately 26 mm throughout the entire backlight region, and measured the distribution of the brightness approximately 17 mm above the support substrate.

FIG. 3 is a schematic diagram showing the distribution of the brightness. The distribution of the brightness at the center of the backlight in the lateral direction (direction of x axis) is shown by the curve $c_1$, and the distribution of the brightness at the center of the backlight in the longitudinal direction (direction of y axis) is shown by the curve $c_2$. Thus, drops $b_1$ to $b_4$ in the brightness E can be observed in the border portions between smaller regions, and in particular, the drop $b_1$ is approximately 4% from the brightness in other portions.

The above described drops in the brightness create horizontal and vertical shadows in the liquid crystal display device, and cause the image quality to deteriorate. As shown in FIG. 3, the drop $b_1$ in the brightness in the lateral direction (direction x) particularly causes such a problem that the reduction in brightness is obvious to the viewer, because the other parts continuously maintain a high brightness.

Figure 4:
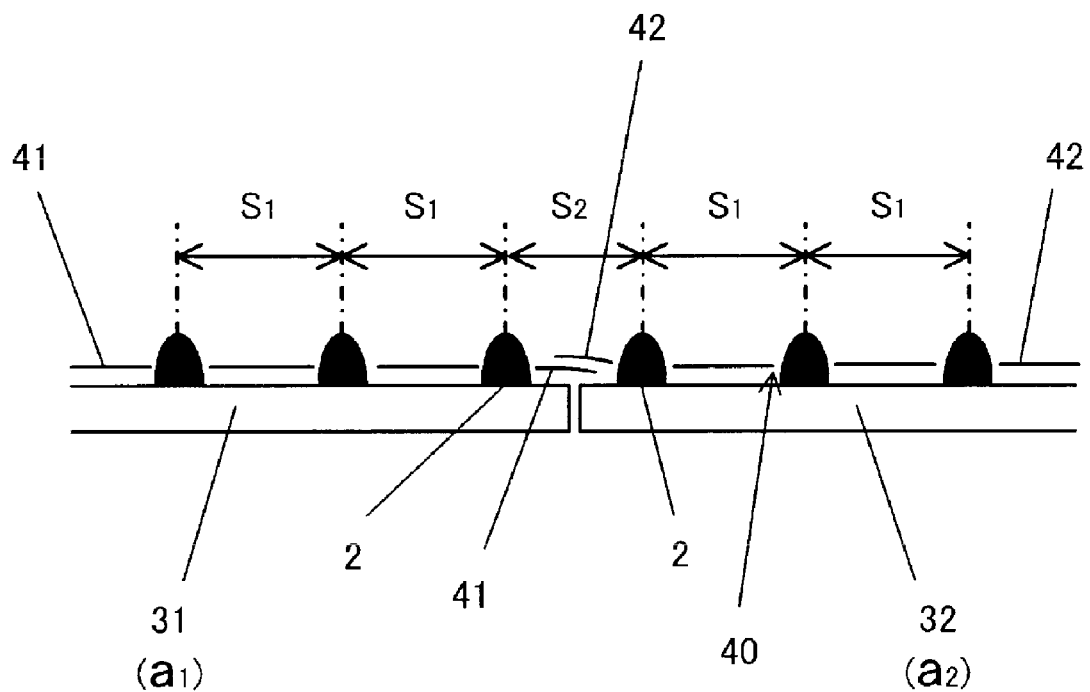
FIG. 4 is a diagram illustrating the center-to-center distance between point light source elements in the backlight for a liquid crystal display device according to the present invention.

For this reason, the intervals between LED's 2 on adjacent support substrates are made smaller than the intervals between LED's 2 on the same support substrate in the present invention. FIG. 4 shows a concrete example. FIG. 4 is a cross sectional diagram showing an enlargement of smaller regions ($a_1$ and $a_2$), and reflective sheets 41 and 42 where a number of openings 40 are created at points where LED's 2 are pasted on the support substrates 31 and 32 on which the LED's 2 are provided. The intervals between LED's 2 on the same support substrate are $S_1$, and the intervals between LED's 2 on adjacent support substrates are $S_2$.

As shown in FIG. 4, the intervals between the LED's 2 are set so that $S_1 > S_2$.

In the configuration of the present embodiment, the intervals between LED's 2 in the border portions between support substrates, where the distribution of brightness would otherwise drop, are smaller than in other regions, and therefore, the brightness can be prevented from lowering, and it becomes possible to form a backlight where there is little inconsistency in the distribution of the brightness as a whole.

In the case where LED's are arranged with a pitch of approximately 26 mm, as shown in FIG. 3, for example, the intervals between point light source elements on either side of the border between adjacent reflective sheets are made approximately 23 mm, so that the brightness in these portions increases by approximately 4%.

Figure 5:
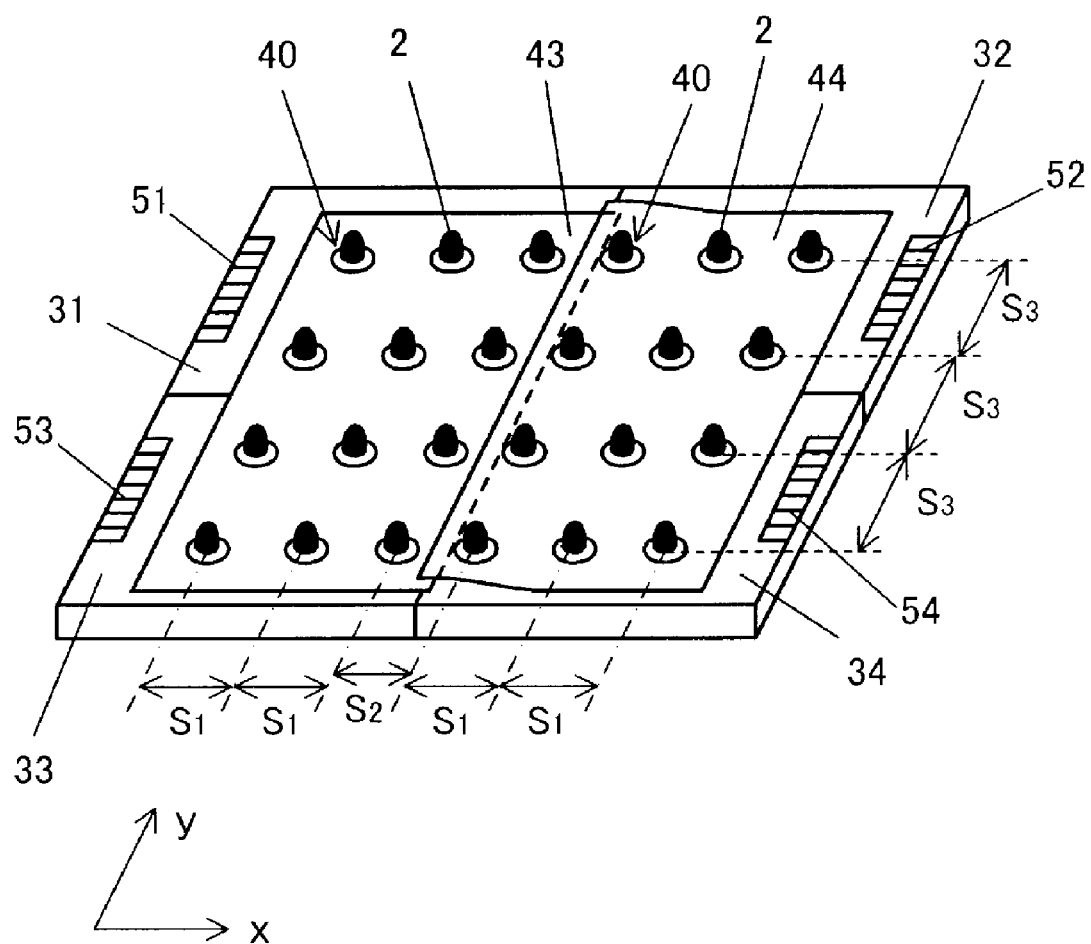
FIG. 5 is a diagram showing the backlight for a liquid crystal display device according to an embodiment of the present invention.
Figure 6:
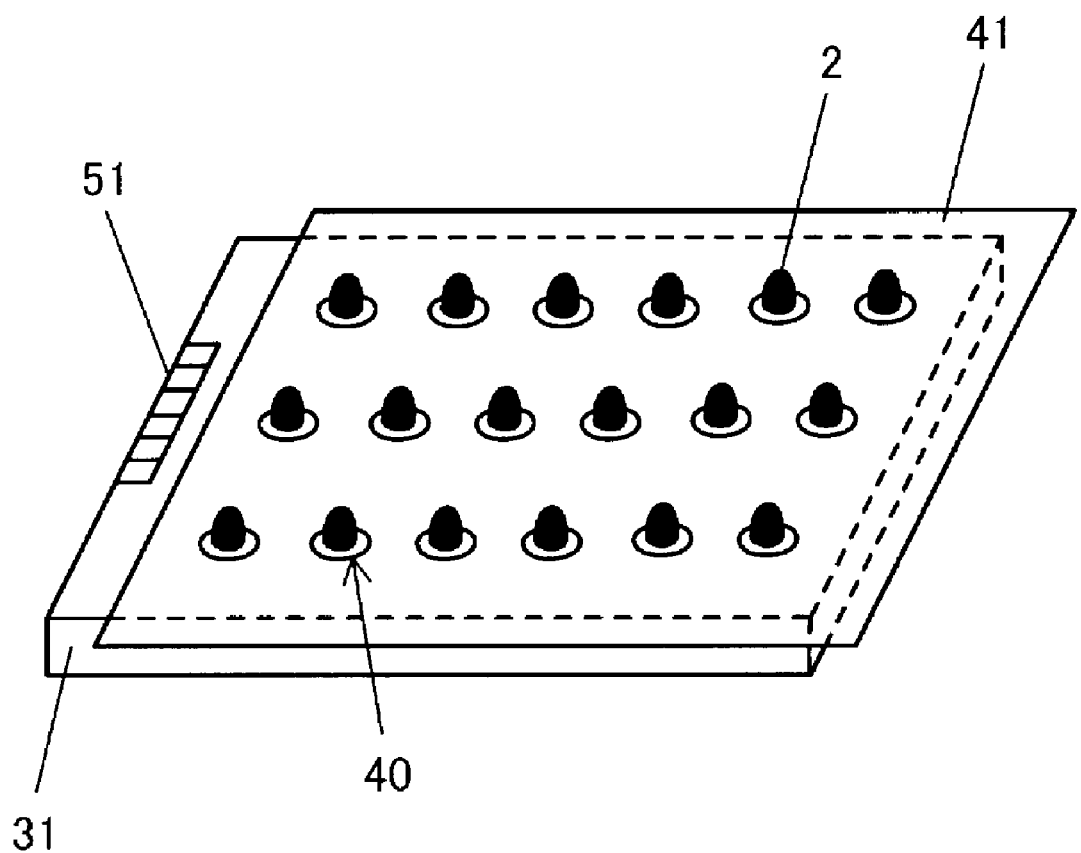
FIG. 6 is a diagram showing a backlight unit and a corresponding reflective sheet that form the backlight for a liquid crystal display device according to an embodiment of the present invention.

Furthermore, as shown in FIGS. 5 and 6, the reflective sheets 43 and 44 overlap in the border portion between the support substrates 31 and 32 (backlight units) according to the present invention. As a result, the reflective sheets overlap over the border between the support substrates, and thus, it becomes possible to further reduce the drop in the distribution of the brightness between the support substrates.

In the present invention, "backlight unit" refers to a support substrate having point light source elements, and the main body of a "backlight" is formed of a number of backlight units which are aligned as the "backlight" is formed of a number of support substrates which are aligned.

FIG. 5 shows an example where the reflective sheets (43 and 44) each cover two support substrates (backlight units) (31 and 33, and 32 and 34). As shown in the figure, reflective sheets may be provided over a number of support substrates instead of over just one. The sheets that form the larger reflective sheet may include at least one smaller region (backlight unit) with an area of which the minimum unit is equal to that of the smaller regions.

Here, it is necessary for the area to "include at least one small region" and "have a minimum unit that is equal to that of the smaller regions." In particular, "area having minimum unit which is equal to that of smaller regions" refers to a structure where the reflective sheet for the support substrate 33 covers the all of the necessary region in the case where the reflective sheet 43 on the support substrate 31 also covers another support substrate 33, as shown in FIG. 5, and thus, the reflective sheet on the support substrate 33 does not cover only part of the necessary region.

As shown in FIG. 5, the border portion between the reflective sheets 43 and 44 is located between the support substrates 31 and 32 and between the support substrates 33 and 34, and the location of the point light source elements on the support substrates is adjusted so that the intervals $S_2$ between LED's 2 on the respective edges of the support substrates 31 and 32 are smaller than the intervals $S_1$ between other LED's in the same direction. Here, there are no reflective sheets borders between the support substrates 31 and 33 and between the support substrates 32 and 34, the intervals $S3$ between LED's 2 are set the same as between other LED's 2 in the same direction.

FIG. 6 shows a reflective sheet 41 provided for one support substrate (backlight unit) 31, and this sheet that forms the larger reflective sheet has approximately the same area as the backlight unit.

As shown in FIGS. 5 and 6, the reflective sheets cover the border portion between support substrates (backlight units), and thus, the point light source elements can always be set at the same point on the support substrates, so that only the intervals between point light source elements in the vicinity of the sides of the support substrates are required to be adjusted. In addition, this structure makes it easy to prevent the brightness from lowering using backlight units of the same standard (size of support substrate and number and arrangement of point light source elements are the same).

In addition, as shown in FIGS. 4 and 5, the sheets that form a larger reflective sheet are arranged so as to overlap in the backlight for a liquid crystal display device according to the present invention. In this case, it is particularly easy for there to be inconsistency in the distribution of the brightness, and thus, it is preferable to apply the present invention.

Though mainly light emitting diodes (LED's) are described above as point light source elements for the backlight for a liquid crystal display device according to the present invention, the present invention is not limited to LED's, and can, of course, be used for any type of point light source.

[Industrial Applicability]

As described above, the present invention can provide a backlight for a liquid crystal display device where the brightness can be prevented from lowering in the longitudinal direction and the lateral direction on the screen, so that high quality images can be provided, where the region where point light source elements are aligned is divided into a number of smaller regions, and backlight units are provided so as to correspond to the respective smaller regions, as well as a liquid crystal display device using the same.

What is claimed is:
1. A backlight for a liquid crystal display device, where a number of point light source elements are aligned in a plane, comprising:

a number of backlight units, each of which is formed of a support substrate for supporting point light source elements and point light source elements arranged on the support substrate, a region in which the point light source elements are aligned being divided into a number of smaller regions, each of which having a backlight unit; and a reflective sheet provided on the support substrates of the backlight units, having openings created at points where the point light source elements are located, characterized in that the reflective sheet is formed of a number of sheets and covers the entire region and the reflective sheet is provided over a number of the support substrates of the backlight units and that a center-to-center distance between each of adjacent point light source elements of adjacent sheets located at adjacent edges of the adjacent sheets is shorter than any center-to-center distance between each of adjacent point light source elements located on the same sheet.

2. The backlight for a liquid crystal display device according to claim 1, characterized in that each sheet that forms the reflective sheet includes at least one smaller region, and that a minimum unit for an area of each sheet is the one smaller region.

3. The backlight for a liquid crystal display device according to claim 2, characterized in that each sheet that forms the reflective sheet has approximately a same area as each of the backlight units.

4. The backlight for a liquid crystal display device according to claim 1, characterized in that the sheets that form the reflective sheet are arranged so as to overlap with each other.

5. The backlight for a liquid crystal display device according to claim 1, characterized in that each of the point light source elements is a light emitting diode.

6. A liquid crystal display device comprising a liquid crystal display panel and a direct backlight for illuminating the liquid crystal display panel, characterized in that the backlight for a liquid crystal display device according to any one of claims 1 to 5 is used as the backlight.

7. A backlight for a liquid crystal display device according to claim 1, characterized in that a relationship of the center-to-center distance between each of the adjacent pointy light source elements of adjacent sheets with respect to the center-to-center distance between each of adjacent point light source elements of the same sheet enables prevention of lowering of brightness along a border between the adjacent sheets.

* * * * *